United States Patent
Sato et al.

(10) Patent No.: US 12,261,554 B2
(45) Date of Patent: Mar. 25, 2025

(54) MOTOR CONTROLLER AND MOTOR CONTROLLING METHOD

(71) Applicant: HITACHI ASTEMO, LTD., Hitachinaka (JP)

(72) Inventors: Yasuaki Sato, Hitachinaka (JP);
Keisuke Suzuki, Hitachinaka (JP);
Katsuhiro Hoshino, Hitachinaka (JP);
Hideki Sekiguchi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 135 days.

(21) Appl. No.: 17/924,655

(22) PCT Filed: Jan. 29, 2021

(86) PCT No.: PCT/JP2021/003172
§ 371 (c)(1),
(2) Date: Nov. 10, 2022

(87) PCT Pub. No.: WO2021/240883
PCT Pub. Date: Dec. 2, 2021

(65) Prior Publication Data
US 2023/0188070 A1     Jun. 15, 2023

(30) Foreign Application Priority Data
May 28, 2020 (JP) .................. 2020-093078

(51) Int. Cl.
*H02P 21/00* (2016.01)
*H02P 21/14* (2016.01)

(52) U.S. Cl.
CPC .................. *H02P 21/141* (2013.01)

(58) Field of Classification Search
CPC .......................................... H02P 21/141
(Continued)

(56) References Cited

U.S. PATENT DOCUMENTS

| 8,242,722 | B2 * | 8/2012 | Matsui | ................... B60L 50/16 318/803 |
| 2009/0179602 | A1 * | 7/2009 | Hayashi | ................... H02P 21/14 318/400.15 |

(Continued)

FOREIGN PATENT DOCUMENTS

| EP | 3809582 A1 | 4/2021 |
| JP | 2017-55552 A | 3/2017 |

(Continued)

OTHER PUBLICATIONS

International Search Report with English Translation and Written Opinion of International Application No. PCT/JP2021/003172 dated Apr. 20, 2021.

*Primary Examiner* — Erick D Glass
(74) *Attorney, Agent, or Firm* — Foley & Lardner LLP

(57) ABSTRACT

Provided is a motor controller that can estimate the magnetic flux of a magnet without changing a current of an electric motor. A motor controller 1 includes a current detecting unit 15 that detects a current of an electric motor 5, a current stability determining unit 10 that determines whether or not a current detected by the current detecting unit 15 is stable, and a magnetic flux calculating unit (filters 8a to 8e, a current conversion unit 4b, a resistance calculating unit 9, a magnet magnetic flux estimating unit 11) that based on a determination made by the current stability determining unit 10 as to current stability, calculates the magnetic flux of a magnet of the electric motor 5, according to a voltage equation in a rotating coordinate system, to output the calculated magnet flux. The motor controller 1 further includes a control voltage output unit (a map 2, voltage instruction units 3a and 3b, a first three-phase conversion unit 4a) that outputs a control voltage to the electric motor 5, based on the magnetic flux of the magnet calculated by the (Continued)

magnetic flux calculating unit and on a torque instruction value.

14 Claims, 6 Drawing Sheets

(58) Field of Classification Search
USPC .................................................. 318/400.02
See application file for complete search history.

(56) References Cited

U.S. PATENT DOCUMENTS

| | | | |
|---|---|---|---|
| 2014/0035495 A1* | 2/2014 | Kim | H02P 27/12 318/400.17 |
| 2014/0333240 A1* | 11/2014 | Kobayashi | H02P 29/662 318/400.02 |
| 2018/0269822 A1 | 9/2018 | Aizawa et al. | |
| 2019/0229661 A1* | 7/2019 | Ogawa | H02P 21/10 |

FOREIGN PATENT DOCUMENTS

| | | |
|---|---|---|
| JP | 6152740 B2 | 6/2017 |
| JP | 6514969 B2 | 5/2019 |
| WO | WO 2016/125567 A1 | 8/2016 |
| WO | WO 2019/239657 A1 | 12/2019 |

* cited by examiner

MOTOR CONTROLLER AND MOTOR CONTROLLING METHOD

TECHNICAL FIELD

The present invention relates to a motor controller and a motor controlling method.

BACKGROUND ART

A magnet used in an electric motor is thermally demagnetized when the temperature of the magnet exceeds a certain temperature. The temperature of the magnet, therefore, needs to be controlled. When the temperature of the electric motor is not controlled, a design margin needs to be taken as thermal demagnetization is taken into consideration. In this case, the capability of the electric motor cannot be sufficiently utilized.

As techniques for sufficiently utilizing the capabilities of an inverter and a motor, techniques of estimating the temperature of a permanent magnet are known.

A technique described in PTL 1 is a technique according to which the temperature of a magnet is estimated by determining current response characteristics, using a changing current instruction value.

A technique described in PTL 2 is a technique by which the magnetic flux of a permanent magnet is estimated because the magnetic flux of the magnet decreases as the temperature of the magnet increases. Specifically, according to the technique described in PTL 2, a permanent magnet synchronous motor is driven as a d-axis current value is caused to change to a plurality of values, and the resulting magnetic flux of the magnet is estimated.

CITATION LIST

Patent Literature

PTL 1: JP 6152740 B2
PTL 2: JP 6514969 B2

SUMMARY OF INVENTION

Technical Problem

The technique disclosed in Patent Literature 1 is considered to be effective from the viewpoint of being able to estimate the temperature of the magnet.

However, to estimate the temperature of the magnet, current needs to be changed, which poses a problem that a rise in the temperature of the magnet leads to a drop in the efficiency of the electric motor.

Likewise, according to the technique described in PTL 2, estimating the temperature of the magnet requires changes in current. This poses the same problem as posed by the technique according to PTL 1 that a rise in the temperature of the magnet leads to a drop in the efficiency of the electric motor.

The present invention has been conceived to solve the above-described problems, and it is therefore an object of the present invention to provide a motor controller and a motor controlling method that can estimate the magnetic flux of a magnet without changing a current instruction to an electric motor.

Solution to Problem

In order to achieve the above object, the present invention is configured as follows.

A motor controller includes: a current detecting unit that detects a current of an electric motor; a current stability determining unit that determines whether or not a current detected by the current detecting unit is stable; a magnetic flux calculating unit that based on the determination by the current stability determining unit, calculates magnetic flux of a magnet of the electric motor, according to a voltage equation in a rotating coordinate system, to output the calculated magnet flux; and a control voltage output unit that outputs a control voltage to the electric motor, based on the magnetic flux of the magnet calculated by the magnetic flux calculating unit and on a torque instruction value.

A motor controlling method includes: detecting a current of an electric motor; determining whether or not the detected current is stable; calculating magnetic flux of a magnet of the electric motor according to a voltage equation in a rotating coordinate system, based on a result of the determination; and outputting a control voltage to the electric motor, based on the calculated magnetic flux of the magnet and on a torque instruction value.

Advantageous Effects of Invention

A motor controller and a motor controlling method that can estimate the magnetic flux of a magnet without changing a current of an electric motor can be provided.

DESCRIPTION OF EMBODIMENTS

Embodiments of the present invention will hereinafter be described with reference to the drawings.

Embodiments (First Embodiment) A motor controller and a motor controlling method according to a first embodiment of the present invention will be described.

Figure 1:
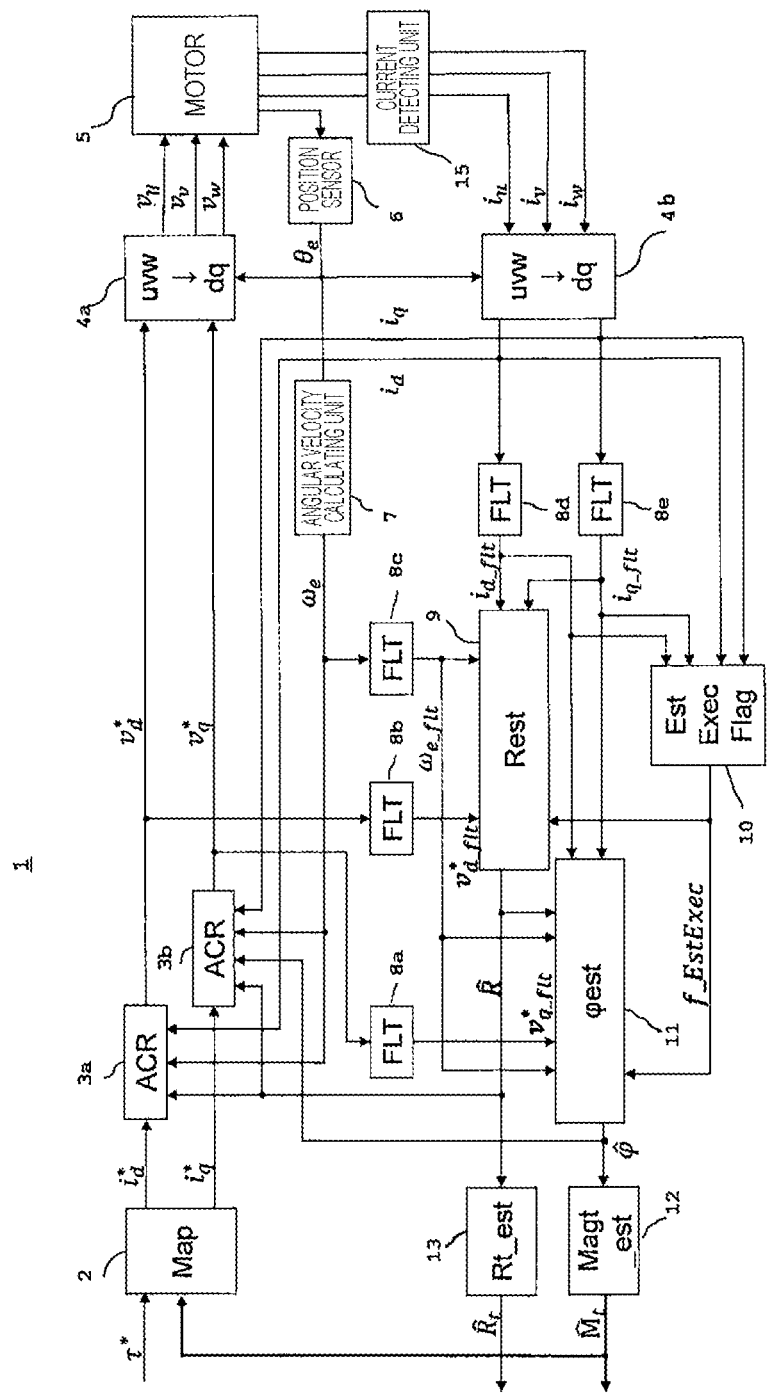
FIG. 1 is a schematic configuration diagram of a motor controller 1 according to a first embodiment.

FIG. 1 is a schematic configuration diagram of a motor controller 1 according to a first embodiment.

In FIG. 1, the motor controller 1 includes a map 2, a first current control unit 3a, a second current control unit 3b, a first three-phase conversion unit 4a, a second three-phase conversion unit 4b, a position sensor 6 that detects a rotational position of an electric motor 5 having a PWM control unit, an angular velocity calculating unit 7, and a current detecting unit 15 that detects a current of the electric motor 5.

The motor controller 1 further includes a first filter 8a, a second filter 8b, a third filter 8c, a fourth filter 8d, a fifth filter 8e, a resistance calculating unit 9 that calculates a coil resistance value of the electric motor 5, a current stability determining unit 10, a magnet magnetic flux estimating unit 11, a magnet temperature calculating unit 12, and a resistance temperature calculating unit 13.

The map 2 calculates a d-axis current instruction i*d and a q-axis current instruction i*q, from a torque instruction value τ* and a magnet temperature estimated value Mt calculated by the magnet temperature calculating unit 12. The calculated d-axis current instruction i*d and q-axis current instruction i*q are converted by the first current control unit 3a and the second current control 3b, into a d-axis voltage instruction v*d and a q-axis voltage instruction v*q, which are then converted by the first three-phase conversion unit 4a, into three-phase voltages Vu, Vv, and Vw, which are outputted to the electric motor 5 having the PWM control unit. Because the first current control unit 3a and the second current control 3b convert the d-axis current instruction i*d and the q-axis current instruction i*q into the d-axis voltage instruction v*d and the q-axis voltage instruction v*q, the first current control unit 3a and the second current control unit 3b can be defined as voltage instruction units.

The position sensor 6 detects a rotation position of the rotor of the electric motor 5, calculates a rotation angle θe, and outputs the rotation angle θe to the angular velocity calculating unit 7 and to the first three-phase conversion unit 4a and the second three-phase conversion unit 4b. The angular velocity calculating unit 7 outputs an angular velocity ωe of the rotor, the angular velocity ωe being calculated from the rotation angle θe, to the first current control unit 3a and the second current control unit 3b and also to the resistance calculating unit 9 and the magnet magnetic flux estimating unit 11 via the third filter 8c.

The second three-phase conversion unit 4b converts three-phase currents iu, iv, and iw of the electric motor 5, the three-phase currents iu, iv, and iw being detected by the current detecting unit 15, into a d-axis current id and a q-axis current iq, and outputs the d-axis current id to the first current control unit 3a and the current stability determining unit 10 and also to the resistance calculating unit 9, the magnet magnetic flux estimating unit 11, and the current stability determining unit 10 via the fourth filter 8d.

The second three-phase conversion unit 4b outputs the q-axis current iq to the second current control unit 3b and the current stability determining unit 10 and also to the resistance calculating unit 9, the magnet magnetic flux estimating unit 11, and the current stability determining unit 10 via the fifth filter 8e.

The second three-phase conversion unit 4b can be defined as a current conversion unit that converts a current of the electric motor 5, the current being detected by the current detecting unit 15, into the q-axis current iq and the d-axis current id.

The resistance calculating unit 9 receives input of the d-axis voltage instruction v*d from the first current control unit 3a, via the second filter 8b, and receives input of a current stability determining signal f_EstExec from the current stability determining unit 10.

The resistance calculating unit 9 outputs a calculated resistance value to the first current control unit 3a, the second current control unit 3b, the resistance temperature calculating unit 13, and the magnet magnetic flux estimating unit 11.

The magnet magnetic flux estimating unit 11 receives input of the q-axis voltage instruction v*q from the second current control unit 3b, via the first filter 8a, and receives the current stability determining signal f_EstExec from the current stability determining unit 10.

The magnet magnetic flux estimating unit 11 outputs calculated magnetic flux φ to the second current control unit 3b and the magnet temperature calculating unit 12.

The magnet temperature calculating unit 12 calculates a magnet temperature Mt, based on the incoming magnetic flux φ from the magnet magnetic flux estimating unit 11, and outputs the magnet temperature Mt to the map 2.

It should be noted that a configuration including the magnet temperature calculating unit 12, the map 2, the first current control unit 3a, the second current control unit 3b, and the first three-phase conversion unit 4a can be defined as a control voltage output unit according to the first embodiment.

In addition, a configuration including the second three-phase conversion unit 4b, the angular velocity calculating unit 7, the first filter 8a to the fifth filter 8e, the resistance calculating unit 9, and the magnet magnetic flux estimating unit 11 can be defined as a magnetic flux calculating unit.

Figure 2:
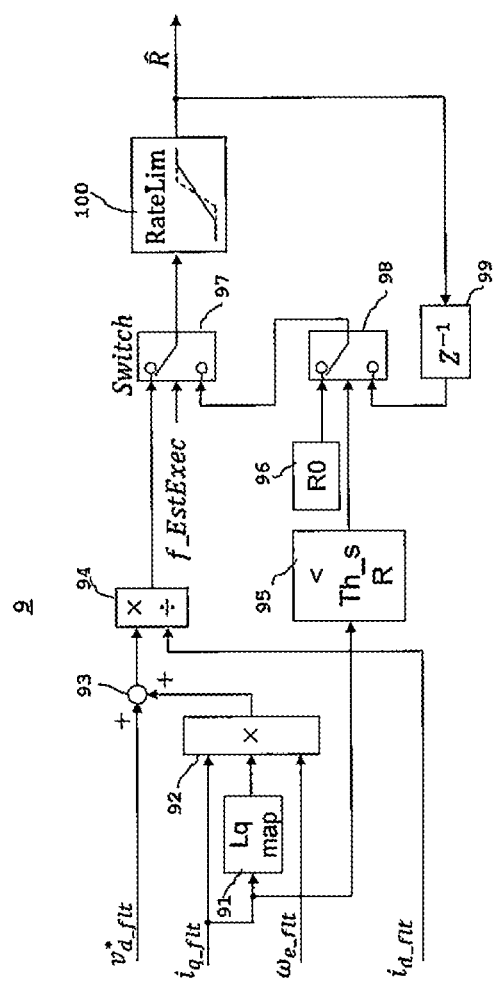
FIG. 2 is an internal configuration diagram of a resistance calculating unit that calculates a resistance value R of an electric motor.

FIG. 2 is an internal configuration diagram of the resistance calculating unit 9 that calculates a resistance value R of the electric motor 5.

In FIG. 2, the resistance calculating unit 9 includes a q-axis inductance map 91, a first multiplying unit 92, an adding unit 93, a first multiplying/dividing unit 94, a first size determining unit 95, a constant resistance memory 96, a first delay unit 99, a first switch 97, a second switch 98, and a resistance value output unit 100.

The q-axis inductance map 91 determines an inductance Lq corresponding to a q-axis current value iq_flt inputted to the q-axis inductance map 91, and outputs the inductance Lq to the first multiplying unit 92. The first multiplying unit 92 multiplies the q-axis current iq_flt, the inductance Lq, and an angular velocity ωe_flt together. Then, the adding unit 93 adds a value resulting from the multiplication by the first multiplying unit 92 to a d-axis voltage vd_flt, and the first multiplying/dividing unit 94 divides a result of the addition by a d-axis current id_flt.

A result of the calculation y the first multiplying/dividing unit 94 is outputted to one input terminal of the first switch 97.

The first size determining unit 95 determines whether or not the q-axis current iq_flt is smaller than a constant value Th_sR (resistance threshold), and outputs a result of the determination to the second switch 98. One input terminal of the second switch 98 is connected to the constant resistance memory 96 storing a constant resistance value R0. Another input terminal of the second switch 98 is connected to the first delay unit 99 in which the previous resistance output value R outputted from the resistance value output unit 100 is stored.

When the result of the determination of the first size determining unit 95 indicates that the q-axis current iq_flt is smaller than the constant value Th_sR, an output value from the second switch 98 is set to the constant resistance value R0. As a result, the constant resistance value R0 is outputted from the first switch 97. When the result of the determination of the first size determining unit 95 indicates that the q-axis current iq_flt is not smaller than the constant value Th_sR, an output value from the second switch 98 is set to the previous resistance output value R. The output value from the second switch 98 is supplied to another input terminal of the first switch 97.

The current stability determining signal f_EstExec is inputted to the first switch 97, at which, when it is determined that the current is stable, one input terminal of the first switch 97 is selected. As a result, an output value from the first multiplying/dividing unit 94 is outputted via the resistance value output unit 100.

When it is determined that the current is not stable (the current fluctuates in a given range or wider range), another input terminal of the first switch 97 is selected. As a result, an output value from the second switch 98 is outputted via the resistance value output unit 100.

Figure 3:
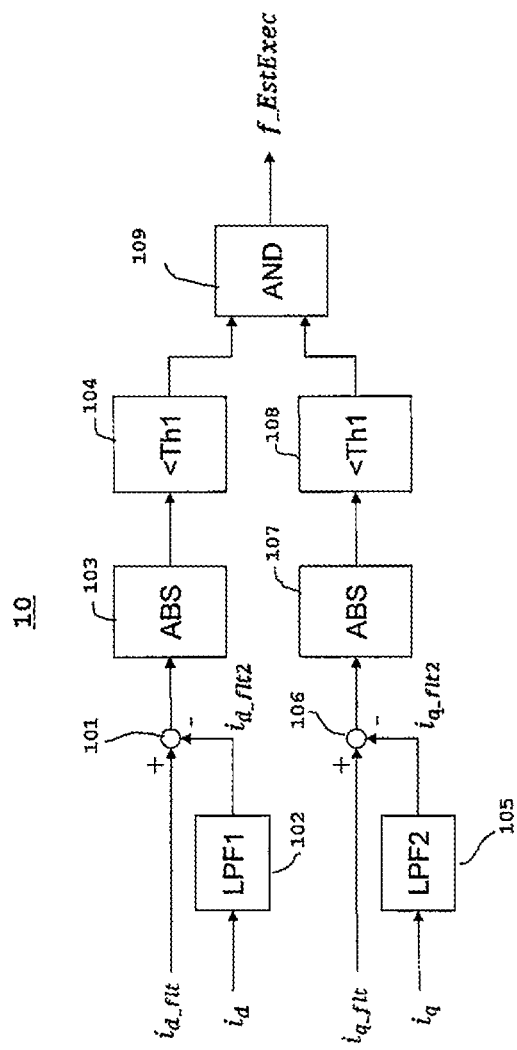
FIG. 3 is an internal configuration diagram of a current stability determining unit.

FIG. 3 is an internal configuration diagram of the current stability determining unit 10. When a change in the q-axis current iq and in the d-axis current id is smaller than a given threshold, the current stability determining unit 10 determines that the current is stable.

In FIG. 3, the current stability determining unit 10 includes a first subtracting unit 101, a ninth low-pass filter 102, a first absolute value unit 103, and a second size determining unit 104.

The current stability determining unit 10 further includes a second subtracting unit 106, a tenth low-pass filter 105, a second absolute value unit 107, a third size determining unit 108, and an AND determining unit 109. A time constant of the ninth low-pass filter 102 is different from a time constant of the fourth filter (fourth low-pass filter) 8$d$ shown in FIG. 1. A time constant of the tenth low-pass filter 105 is different from a time constant of the fifth filter (fifth low-pass filter) 8$e$ shown in FIG. 1.

The d-axis current id_flt having passed through the fourth filter 8$d$ and a d-axis current id_flt2 that is the d-axis current id having passed through the ninth low-pass filter 102 are supplied to the first subtracting unit 101, which subtracts the d-axis current id_flt2 from the d-axis current id_flt. A result of the subtraction is supplied to the first absolute value unit 103, which calculates an absolute value. The absolute value calculated by the first absolute value unit 103 is then outputted to the second size determining unit 104. The second size determining unit 104 outputs a signal "1" to the AND determining unit 109 only when the absolute value calculated by the first absolute value unit 103 is smaller than a constant value Th1 (threshold).

The q-axis current iq_flt having passed through the fifth filter 8$e$ and a q-axis current iq_flt2 that is the q-axis current iq having passed through the tenth low-pass filter 105 are supplied to the second subtracting unit 106, which subtracts the q-axis current iq_flt2 from the q-axis current iq_flt. A result of the subtraction is supplied to the second absolute value unit 107, which calculates an absolute value. The absolute value calculated by the second absolute value unit 107 is then outputted to the third size determining unit 108. The third size determining unit 108 outputs a signal "1" to the AND determining unit 109 only when the absolute value calculated by the second absolute value unit 107 is smaller than the constant value Th1 (threshold).

The AND determining unit 109 outputs the current stability determining signal f_EstExec only when both of output signals from the second size determining unit 104 and the third size determining unit 108 are "1".

Specifically, the current stability determining unit 10 determines that the current detected by the current detecting unit 15 is stable when a difference between a current value of the q-axis current iq having passed through the fifth low-pass filter 8$e$ and a current value of the q-axis current iq having passed through the tenth low-pass filter 105 whose time constant is different from that of the fifth low-pass filter 8$e$ is smaller than a given threshold and a difference between a current value of the d-axis current id having passed through the fourth low-pass filter 8$d$ and a current value of the d-axis current id having passed through the ninth low-pass filter 102 whose time constant is different from that of the fourth low-pass filter 8$d$ is too smaller than the given threshold.

Figure 4:
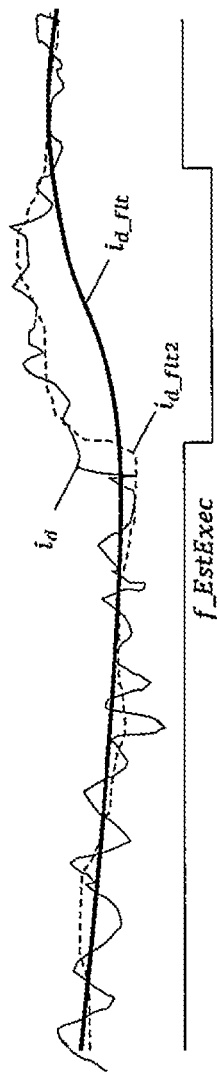
FIG. 4 is an explanatory diagram of a case where a current stability determining signal is outputted from a current stability determining unit.

FIG. 4 is an explanatory diagram of a case where the current stability determining signal f_EstExec is outputted from the current stability determining unit 10.

In FIG. 4, a thin solid line represents the d-axis current id, a thick solid line represents the d-axis current id_flt, and a broken line represents the d-axis current id_flt2. It should be noted that although only the d-axis currents are shown in FIG. 4 for simpler illustration, the q-axis currents change in the same manner as the d-axis currents do.

As shown in FIG. 4, the current stability determining signal f_EstExec becomes a "H" level signal only when the absolute value of a value given by subtracting the d-axis current id_flt2 from the d-axis current id_flt is smaller than the constant value Th1.

In other words, when both d-axis current id and q-axis current iq fluctuate a little and are therefore stable, the current stability determining signal f_EstExec becomes the "H" level signal.

Figure 5:
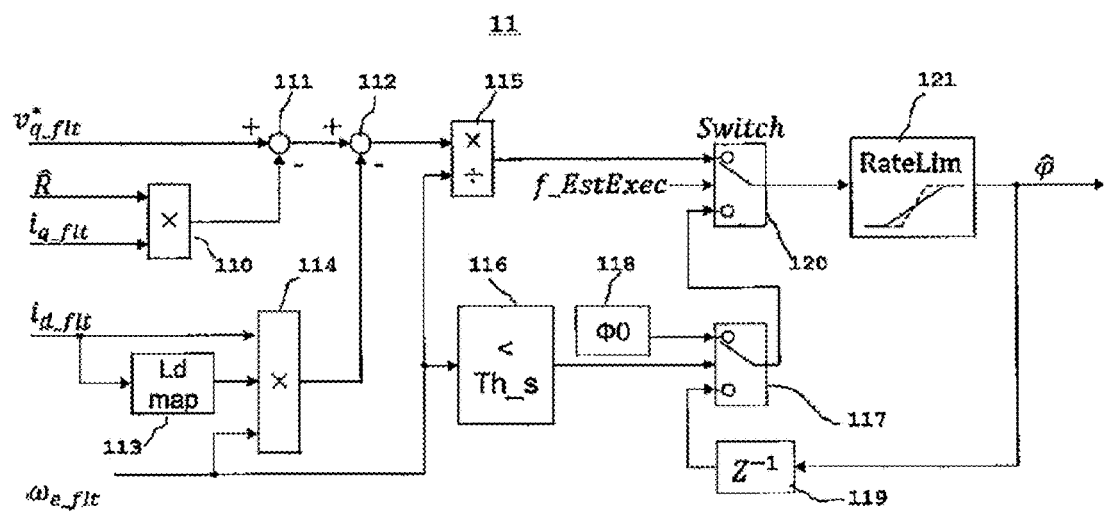
FIG. 5 is an internal configuration diagram of a magnet magnetic flux estimating unit.

FIG. 5 is an internal configuration diagram of the magnet magnetic flux estimating unit 11.

In FIG. 5, the magnet magnetic flux estimating unit 11 includes a second multiplying unit 110, a third subtracting unit 111, a fourth subtracting unit 112, a d-axis inductance map 113, a third multiplying unit 114, a second multiplying/dividing unit 115, a fifth size determining unit 116, a fourth switch 117, a constant magnetic flux memory 118, a second delay unit 119, a third switch 120, and a magnetic flux value output unit 121.

The second multiplying unit 110 multiplies the resistance output value R from the resistance calculating unit 9 by the q-axis current iq_flt from the fifth filter 8e, and outputs a result of the multiplication to the third subtracting unit 111. The third subtracting unit 111 subtracts the output value from the second multiplying unit 110, from a q-axis voltage v*q_flt outputted from the first filter 8$a$.

The d-axis inductance map 113 determines the inductance Ld corresponding to the d-axis current value id_flt inputted to the d-axis inductance map 113, and outputs the inductance Ld to the third multiplying unit 114. The third multiplying unit 114 multiplies the d-axis current id_flt, the inductance Ld, and an angular velocity ωe_flt together.

Then, at the fourth subtracting unit 112, an output value from the third multiplying unit 114 is subtracted from an output value from the third subtracting unit 111.

An output value from the fourth subtracting unit 112 and the angular velocity ωe_flt are divided by the second multiplying/dividing unit 115, and a result of the division is outputted to one input terminal of the third switch 120.

The fifth size determining unit 116 determines whether or not the angular velocity ωe_flt is smaller than a constant value (constant speed threshold), and outputs a result of the determination to the fourth switch 117. One input terminal of the fourth switch 117 is connected to the constant magnetic flux memory 118 in which a constant magnetic flux value φ0 is stored. Another input terminal of the fourth switch 117 is connected to the second delay unit 119 in which the previous magnetic flux output value φ outputted from the magnetic flux value output unit 121 is stored.

When the result of the determination of the fifth size determining unit 116 indicates that the angular velocity ωe_flt is smaller than the constant value Th_s, an output value from the fourth switch 117 is set to the magnetic flux value φ0. As a result, the magnetic flux value φ0 is outputted from the third switch 120. When the result of the determination of the fifth size determining unit 116 indicates that the angular velocity ωe_flt is not smaller than the constant value Th_s, an output value from the fourth switch 117 is set to the previous magnetic flux value φ. The output value from the fourth switch 117 is supplied to another input terminal of the third switch 120.

When the angular velocity ωe_flt is smaller than the constant value Th_s, the q-axis voltage is small, because of which an S/N ratio drops (that is, an error in an estimated value increases). For this reason, in this case, a preset magnetic flux value is used. This magnetic flux value may be extracted from pre-estimated results or provided as a magnetic flux value having been estimated by solving, for example, a thermal circuit equation.

The current stability determining signal f_EstExec is inputted to the third switch 120, at which, when it is determined that the current is stable, one input terminal of the third switch 120 is selected. As a result, an output value from the second multiplying/dividing unit 115 is outputted via the magnetic flux value output unit 121.

When it is determined that the current is not stable (the current fluctuates in a given range or wider range), another input terminal of the third switch 120 is selected. As a result, an output value from the fourth switch 117 is outputted via the magnetic flux value output unit 121.

Operations according to the first embodiment of the present invention will then be described with reference to the following equations (1) to (5).

[Equation 1]
$$v_d = Ri_d + L_d \frac{di_d}{dt} - \omega L_q i_q \quad (1)$$

[Equation 2]
$$v_d = Ri_d - \omega L_q i_q \quad (2)$$

[Equation 3]
$$v_q = Ri_q + L_q \frac{di_q}{dt} + \omega L_q i_q + \omega \varphi \quad (3)$$

[Equation 4]
$$v_q = Ri_q + \omega L_q i_d + \omega \varphi \quad (4)$$

[Equation 5]
$$\varphi(T) = \varphi(T0) + Kbr \cdot \varphi(T0) \cdot (T - T0) \quad (5)$$

The above equations (1) and (3) are voltage equations in a rotating coordinate system. According to the present invention, the magnetic flux of the magnet of the electric motor 5 is calculated, using these voltage equations. Because the d-axis current id is stable and is filtered sufficiently, a differential term in the above equation (1) can be ignored. In other words, the equation (1) can be reduced to the equation (2).

The resistance calculating unit 9 calculates the resistance R, from the d-axis current id, the q-axis current iq, the angular velocity ω, the q-axis inductance Lq, and the d-axis voltage vd, which are shown in the equation (2).

Because the q-axis current iq is stable and is filtered sufficiently, a differential term in the above equation (3) can be ignored. In other words, the equation (3) can be reduced to the equation (4), from which the flux φ can be calculated.

The magnet magnetic flux estimating unit 11 calculates the magnetic flux φ, from the q-axis current iq, the d-axis current id, the angular velocity ω, the d-axis inductance Ld, the q-axis voltage vq, and the resistance R, which are shown in the equation (4).

The magnet temperature calculating unit 12 estimates a magnet temperature, using the above equation (5).

In the equation (5), φ(T) denotes interlinkage magnetic flux of the permanent magnet at T° C., φ(T0) denotes interlinkage magnetic flux of the permanent magnet at T0° C., Kbr denotes a temperature coefficient of a residual magnetic flux density of the permanent magnet, and T denotes a temperature of the permanent magnet of the electric motor 5. The temperature coefficient Kbr and the interlinkage magnetic flux φ (T0) are known values, and p (I) is a value that the magnet magnetic flux estimating unit 11 inputs to the magnet temperature calculating unit 12. A magnet temperature T, therefore, can be calculated using the equation (5).

The magnet temperature calculating unit 12 outputs the calculated magnet temperature T to the map 2, as the magnet temperature estimated value Mt. As described above, the map 2 calculates the d-axis current instruction i*d and the q-axis current instruction i*q, from the torque instruction value τ* and the magnet temperature estimated value Mt calculated by the magnet temperature calculating unit 12.

It should be noted that the magnet temperature calculating unit 12 may be configured as a map that stores magnet temperatures corresponding to values of the magnetic flux φ.

Figure 6:
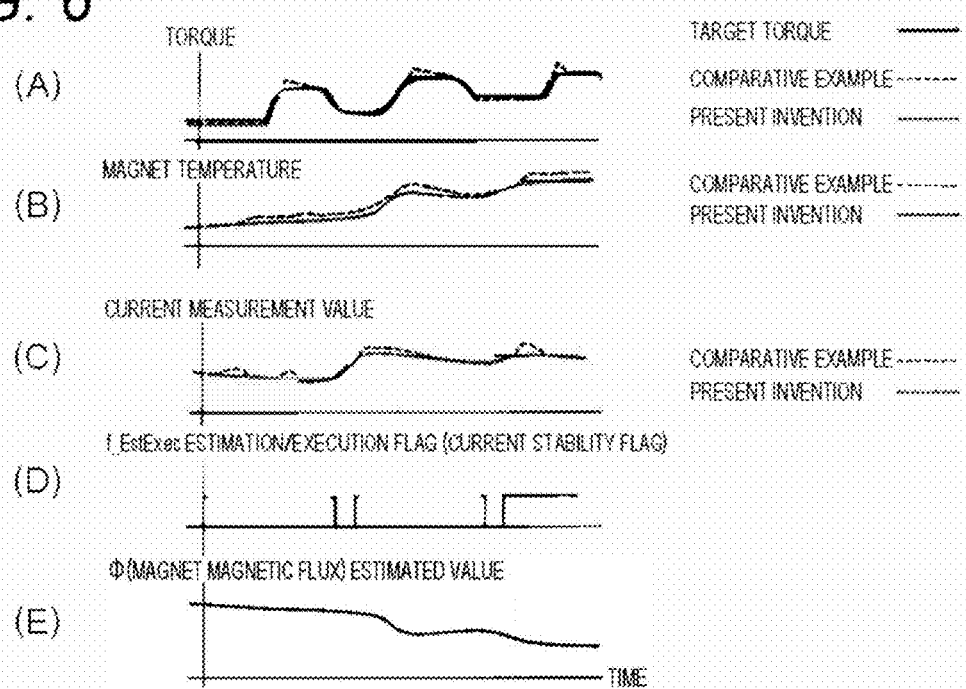
FIG. 6 is a chart schematically showing a difference between the first embodiment and a comparative example to which the present invention is not applied.

FIG. 6 is a chart schematically showing a difference between the first embodiment and a comparative example to which the present invention is not applied. The comparative example is an example in which current response characteristics for estimation of the temperature of the magnet are determined, using a changing current instruction value, and the temperature of the magnet is estimated.

In (C) of FIG. 6, a current measurement value according to the present invention is indicated by a solid line, while a current measurement value according to the comparative example is indicated by a broken line.

In the case of the comparative example, current response characteristics for estimation of the temperature of the magnet are determined, using a changing current instruction value, and the temperature of the magnet is estimated. Because of this process, the current measurement value in the comparative example fluctuates heavier than the current measurement value in the first embodiment of the present invention.

As shown in (D) of FIG. 6, in the first embodiment, when the current measurement value shown in (C) of FIG. 6 is stable, the current stability determining signal f_EStExec (current stabilizing plan flag) becomes a "H" level signal. In (A) of FIG. 6, a target torque is indicated by a thick solid line, a torque according to the first embodiment is indicated by a thin solid line, and a torque according to the comparative example is indicated by a broken line. In (B) of FIG. 6, a magnet temperature according to the first embodiment is indicated by a solid line, and a magnet temperature according to the comparative example is indicated by a broken line.

The torque according to the first embodiment of the present invention and the target torque almost match to the extent that discriminating the torque according to the first embodiment from the target torque is difficult. In the case of the first embodiment, by feeding magnet temperature characteristics back to torque control, a torque the driver or an advanced driver assistance system (ADAS) needs can be outputted precisely.

As a result, a drop in driving performance (speed controllability) due to insufficient acceleration (regeneration) can be suppressed.

In the first embodiment, magnetic flux estimation is made without current fluctuation when the motor runs normally. In the comparative example, in contrast, when responses of the d-axis current and q-axis current vary, it results in toque fluctuations, which raises a concern that a torque error may arise to miss the target torque. When such a torque error arises, it may lead to increasing noise and vibrations.

In the case of the first embodiment, estimating the magnet temperature by changing an operating point from a current that achieves the maximum efficiency is unnecessary. This reduces a possibility that a drop in the efficiency may occur.

In a case where the magnet temperature is estimated by changing an operating point of the current, as is in the comparative example, the current needs to be increased, which causes the magnet temperature to rise.

The first embodiment does not require that the magnet temperature be estimated by changing the operating point of the current. A rise in the magnet temperature caused by a current increase, therefore, does not occur.

(E) of FIG. 6 shows a time-dependent change in an estimated value of the magnetic flux of the magnet. The magnetic flux of the magnet is estimated by estimating the magnet temperature. By estimating the magnet temperature, a torque value (current value) can be limited properly in such a way as to prevent the magnet from carrying a magnet temperature that causes irreversible demagnetization. As a result, the torque of the electric motor 5 is not limited excessively when the magnet temperature rises, and therefore better driving performance can be maintained.

When the magnet temperature is not estimated, it is necessary to limit the torque with an excessive margin set. This makes it necessary to start torque limitation in a relatively low temperature range, thus raising a possibility that the driving performance may be impaired.

In the first embodiment of the present invention, estimation of the magnet temperature can be executed without changing a current instruction to the electric motor 5. As a result, better driving performance can be maintained without causing a drop in the efficiency of the electric motor 5.

As described above, according to the first embodiment of the present invention, the motor controller and the motor controlling method that can estimate the magnetic flux of the magnet without changing a current instruction to the electric motor 5 can be provided.

According to the first embodiment of the present invention, the current being in a stable state is determined, and when the current is in the stable state, the voltage equation in the rotating coordinate system is solved, with a differential term of current being ignored, to calculate the magnetic flux of the magnet. The differential term of current may be unstable due to the influence of noise. According to the first embodiment, however, this unstable differential term can be ignored, and therefore the magnetic flux and magnet temperature can be calculated more accurately. In a case where a configuration that is likely to invite a temperature rise, such as a motor-inverter integrated gear (MIG), is adopted, because the magnet temperature can be estimated when the electric motor 5 is running normally, a rise in the magnet temperature can be suppressed or a warning against a rise in the magnet temperature can be issued.

According to the first embodiment, when the current is unstable, the d-axis current instruction i*d and the q-axis current instruction i*q are calculated, using a constant resistance value or a previous resistance value and constant magnetic flux or previous magnetic flux, as a resistance value and magnetic flux for the calculation. Even when the current is in an unstable state, therefore, the torque of the electric motor 5 can be limited, which ensures improved driving safety.

(Second Embodiment) A second embodiment of the present invention will then be described.

Figure 7:
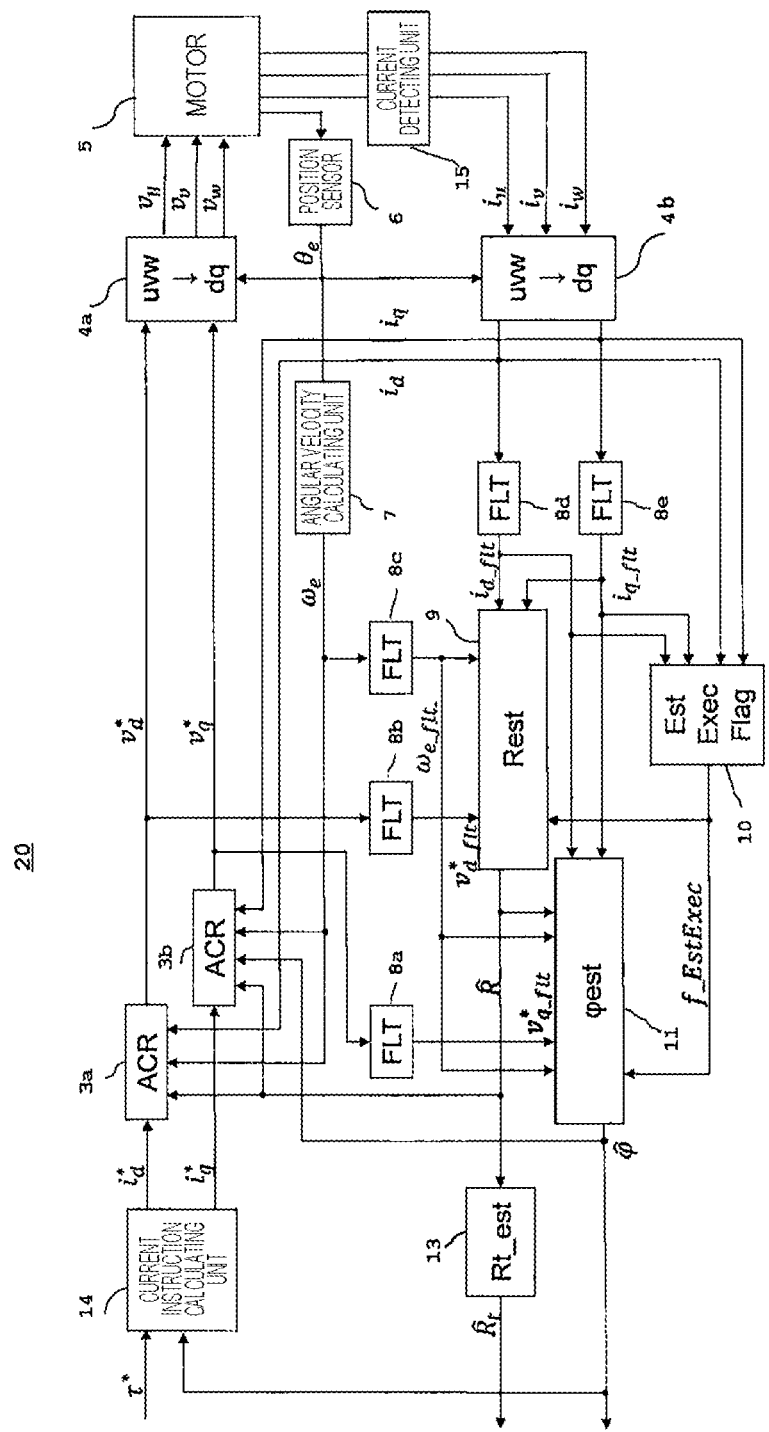
FIG. 7 is a schematic configuration diagram of a motor controller according to a second embodiment.

FIG. 7 is a schematic configuration diagram of a motor controller 20 according to the second embodiment.

A difference between the first example and the second embodiment is that the second embodiment does not include the magnet temperature calculating unit 12 of the first embodiment and that in the second embodiment, the map 2 of the first embodiment is replaced with a current instruction calculating unit 14. Except these respects, the second embodiment is the same in configuration as the first embodiment.

It should be noted that a configuration including the current instruction calculating unit 14, the first current control unit 3*a*, the second current control unit 3*b*, and the first three-phase conversion unit 4*a* can be defined as a control voltage output unit in the second embodiment.

The current designation calculating unit 14 shown in FIG. 6 calculates the d-axis current instruction i*d and the q-axis current instruction i*q, from the magnetic flux φ, which is calculated by the magnet magnetic flux estimating unit 11, and the torque instruction value τ*.

The other operations in the second embodiment are the same as the operations in the first embodiment.

According to the second embodiment, in the same manner as in the first embodiment of the present invention, calculation of the magnetic flux of the magnet can be executed without changing a current instruction to the electric motor 5. As a result, better driving performance can be maintained without causing a drop in the efficiency of the electric motor 5.

As described above, according to the second embodiment of the present invention, the motor controller and the motor controlling method that can estimate the magnetic flux of the magnet without changing a current instruction to the electric motor 5 can be provided.

According to the second embodiment of the present invention, in the same manner as in the first embodiment, the current being in a stable state is determined, and when the current is in the stable state, the voltage equation in the rotating coordinate system is solved, with a differential term of current being ignored, to calculate the magnetic flux of the magnet. The differential term of current may be unstable due to the influence of noise. According to the second embodiment, however, this unstable differential term can be ignored, and therefore the magnetic flux and magnet temperature can be calculated more accurately.

According to the second embodiment of the present invention, in the same manner as in the first embodiment, when the current is unstable, the d-axis current instruction i*d and the q-axis current instruction i*q are calculated, using a constant resistance value or a previous resistance value and constant magnetic flux or previous magnetic flux, as a resistance value and magnetic flux for the calculation. Even when the current is in an unstable state, therefore, the torque of the electric motor 5 can be limited, which ensures improved driving safety.

According to the present invention, when the estimated number of interlinkage magnetic flux at the time of the rotor (magnet) temperature being stable, e.g., at the time of starting the electric motor 5 having been left idle for a long time, deviates from a reference value by a given value or more, the reference value is updated based on an estimated value. Alternatively, an abnormal state is concluded and a Waring may be issued to the driver or traveling stop control may be carried out. Because it is a case of a change in a non-temperature factor, the case can be considered to be a characteristic change caused by a deterioration process, etc.

According to the present invention, a temperature sensor that measures the temperature of the electric motor 5 is provided, and when a difference equal to or more than a given value is found between a temperature detection value from the temperature sensor and a motor magnet temperature estimated value at the time of starting the electric motor 5 having been left idle for a certain period of time or more, a reference value is updated based on the motor magnet temperature estimated value. Alternatively, an abnormal state is concluded and a waring may be issued to the driver or traveling stop control may be carried out.

It should be noted, however, that the above updating, warning, and traveling stop control can be done only when the temperature sensor's operating normally is determined.

REFERENCE SIGNS LIST 1, 20 motor controller
2 map
3a first current control unit
3b second current control unit
4a first three-phase conversion unit
4b second three-phase conversion unit
5 electric motor
6 position sensor
7 angular velocity calculating unit
8a to 8e first filter to fifth filter
9 resistance calculating unit
10 current stability determining unit
11 magnet magnetic flux estimating unit
12 magnet temperature calculating unit
13 resistance temperature calculating unit
14 current instruction calculating unit
15 current detecting unit
91 q-axis inductance map
92 first multiplying unit
93 adding unit
94 first multiplying/dividing unit
95 first size determining unit
96 constant resistance memory
97 first switch
98 second switch
99 first delay unit
100 resistance value output unit
101 first subtracting unit
102 ninth low-pass filter
103 first absolute value unit
104 second size determining unit
105 tenth low-pass filter
106 second subtracting unit
107 second absolute value unit
108 third size determining unit
109 AND determining unit
110 second multiplying unit
111 third subtracting unit
112 fourth subtracting unit
113 d-axis inductance map
114 third multiplying unit
115 second multiplying/dividing unit
116 fifth size determining unit
117 fourth switch
118 constant magnetic flux memory
119 second delay unit
120 third switch
121 magnetic flux value output unit

The invention claimed is:

1. A motor controller comprising:
a current detecting unit that detects a current of an electric motor;
a current stability determining unit that determines whether or not a current detected by the current detecting unit is stable;
a magnetic flux calculating unit that based on the determination by the current stability determining unit, calculates magnetic flux of a magnet of the electric motor, according to a voltage equation in a rotating coordinate system, to output the calculated magnet flux;
a current conversion unit that converts a current of the electric motor, the current being detected by the current detecting unit, into a q-axis current and a d-axis current; and
a control voltage output unit that outputs a control voltage to the electric motor, based on the magnetic flux of the magnet calculated by the magnetic flux calculating unit and on a torque instruction value,
wherein the current stability determining unit determines that a current detected by the current detecting unit is stable when a change in the q-axis current and a change in the d-axis current are each smaller than a given threshold.

2. The motor controller according to claim 1, wherein the control voltage output unit includes:
a magnet temperature calculating unit that calculates a temperature of the magnet, from the magnetic flux calculated by the magnetic flux calculating unit;
a map that calculates a current instruction, based on a temperature of the magnet and on the torque instruction value;
a voltage instruction unit that converts the current instruction into a voltage instruction; and
a control voltage conversion unit that converts the voltage instruction into a control voltage.

3. The motor controller according to claim 1, wherein the control voltage output unit includes:
a current instruction calculating unit that calculates a current instruction, based on the magnetic flux calculated by the magnetic flux calculating unit and on the torque instruction value;
a voltage instruction unit that converts the current instruction into a voltage instruction; and
a control voltage conversion unit that converts the voltage instruction into a control voltage.

4. The motor controller according to claim 1, wherein when a difference between a current value of the q-axis current having passed through a fifth low-pass filter and a current value of the q-axis current having passed through a tenth low-pass filter whose time constant is different from a time constant of the fifth low-pass filter is smaller than the given threshold and a difference between a current value of the d-axis current having passed through a fourth low-pass filter and a current value of the d-axis current having passed through a ninth low-pass filter whose time constant is different from a time constant of the fourth low-pass filter is too smaller than the given threshold, it is determined that a current detected by the current detecting unit is stable.

5. The motor controller according to claim 1, wherein
the magnetic flux calculating unit includes a resistance calculating unit that calculates a coil resistance value of the electric motor, using the q-axis current and the d-axis current, and
the magnetic flux calculating unit calculates magnetic flux of the magnet, using the coil resistance value calculated by the resistance calculating unit, and the resistance calculating unit determines whether or not the q-axis current is smaller than a resistance threshold and when the q-axis current is smaller than the resistance threshold, outputs a constant resistance value.

6. The motor controller according to claim 1, wherein
the magnetic flux calculating unit includes a resistance calculating unit that calculates a coil resistance value of the electric motor, using the q-axis current and the d-axis current, and
the magnetic flux calculating unit calculates magnetic flux of the magnet, using the coil resistance value calculated by the resistance calculating unit, and the resistance calculating unit determines whether or not the q-axis current is smaller than a resistance threshold and when determining that a current detected by the current detecting unit is not stable and that the q-axis current is equal to or larger than the resistance threshold, outputs a previously calculated resistance value.

7. A motor controller comprising:
a current detecting unit that detects a current of an electric motor;
a current stability determining unit that determines whether or not a current detected by the current detecting unit is stable;
a magnetic flux calculating unit that based on the determination by the current stability determining unit, calculates magnetic flux of a magnet of the electric motor, according to a voltage equation in a rotating coordinate system, to output the calculated magnet flux;
an angular velocity calculating unit that calculates an angular velocity of a rotor of the electric motor; and
a control voltage output unit that outputs a control voltage to the electric motor, based on the magnetic flux of the magnet calculated by the magnetic flux calculating unit and on a torque instruction value, the control voltage output unit comprising;
 a magnet temperature calculating unit that calculates a temperature of the magnet, from the magnetic flux calculated by the magnetic flux calculating unit;
 a map that calculates a current instruction, based on a temperature of the magnet and on the torque instruction value;
 a voltage instruction unit that converts the current instruction into a voltage instruction; and
 a control voltage conversion unit that converts the voltage instruction into a control voltage,
wherein the magnetic flux calculating unit determines whether or not the angular velocity is smaller than a constant speed threshold, and when the angular velocity is smaller than a constant speed threshold, outputs a constant magnetic flux value.

8. A motor controller comprising:
a current detecting unit that detects a current of an electric motor;
a current stability determining unit that determines whether or not a current detected by the current detecting unit is stable;
a magnetic flux calculating unit that based on the determination by the current stability determining unit, calculates magnetic flux of a magnet of the electric motor, according to a voltage equation in a rotating coordinate system, to output the calculated magnet flux;
an angular velocity calculating unit that calculates an angular velocity of a rotor of the electric motor; and
a control voltage output unit that outputs a control voltage to the electric motor, based on the magnetic flux of the magnet calculated by the magnetic flux calculating unit and on a torque instruction value, the control voltage output unit comprising;
 a magnet temperature calculating unit that calculates a temperature of the magnet, from the magnetic flux calculated by the magnetic flux calculating unit;
 a map that calculates a current instruction, based on a temperature of the magnet and on the torque instruction value;
 a voltage instruction unit that converts the current instruction into a voltage instruction; and
 a control voltage conversion unit that converts the voltage instruction into a control voltage,
wherein the magnetic flux calculating unit determines whether or not the angular velocity is smaller than a constant speed threshold, and when determining that a current detected by the current detecting unit is not stable and that the angular velocity is equal to or larger than a constant speed threshold, outputs a previously calculated magnetic flux value.

9. A motor controlling method comprising:
detecting a current of an electric motor;
determining whether or not the detected current is stable;
calculating magnetic flux of a magnet of the electric motor according to a voltage equation in a rotating coordinate system, based on the determination;
outputting a control voltage to the electric motor, based on the calculated magnetic flux of the magnet and on a torque instruction value;
converting a current of the electric motor into a q-axis current and a d-axis current; and
determining that the current is stable when a change in the q-axis current and a change in the d-axis current are each smaller than a given threshold.

10. The motor controlling method according to claim 9, comprising:
calculating a temperature of the magnet, from the calculated magnetic flux;
calculating a current instruction, based on the temperature of the magnet and on the torque instruction value;
converting the current instruction into a voltage instruction; and
converting the voltage instruction into a control voltage.

11. The motor controlling method according to claim 9, comprising:
calculating a current instruction, based on the calculated magnetic flux and on the torque instruction value;
converting the calculated current instruction into a voltage instruction; and
converting the converted voltage instruction into a control voltage.

12. The motor controlling method according to claim 9, wherein when a difference between a current value of the q-axis current having passed through a fifth low-pass filter and a current value of the q-axis current having passed through a tenth low-pass filter whose time constant is different from a time constant of the fifth low-pass filter is smaller than the given threshold and a difference between a current value of the d-axis current having passed through a fourth low-pass filter and a current value of the d-axis current having passed through a ninth low-pass filter whose time constant is different from a time constant of the fourth low-pass filter is smaller than the given threshold, it is determined that the current is stable.

13. A motor controlling method comprising:
 detecting a current of an electric motor;
 determining whether or not the detected current is stable;
 calculating magnetic flux of a magnet of the electric motor according to a voltage equation in a rotating coordinate system, based on the determination;
 outputting a control voltage to the electric motor, based on the calculated magnetic flux of the magnet and on a torque instruction value;
 calculating a temperature of the magnet, from the calculated magnetic flux;
 calculating a current instruction, based on the temperature of the magnet and on the torque instruction value;
 converting the current instruction into a voltage instruction;
 converting the voltage instruction into a control voltage;
 calculating an angular velocity of a rotor of the electric motor;
 determining whether or not the angular velocity is smaller than a constant speed threshold; and
 outputting a constant magnetic flux value when the angular velocity is smaller than a constant speed threshold.

14. A motor controlling method comprising:
 detecting a current of an electric motor;
 determining whether or not the detected current is stable;
 calculating magnetic flux of a magnet of the electric motor according to a voltage equation in a rotating coordinate system, based on the determination;
 outputting a control voltage to the electric motor, based on the calculated magnetic flux of the magnet and on a torque instruction value;
 calculating a temperature of the magnet, from the calculated magnetic flux;
 calculating a current instruction, based on the temperature of the magnet and on the torque instruction value;
 converting the current instruction into a voltage instruction;
 converting the voltage instruction into a control voltage;
 calculating the angular velocity of the rotor of the electric motor;
 determining whether or not the angular velocity is smaller than a constant speed threshold; and
 outputting a previously calculated magnetic flux value when determining that the current is not stable and that the angular velocity is equal to or larger than a constant speed threshold.

* * * * *